United States Patent
Barile et al.

(10) Patent No.: US 7,814,535 B1
(45) Date of Patent: Oct. 12, 2010

(54) METHOD AND APPARATUS FOR PEER-TO-PEER COMPLIANCY VALIDATION IN SECURE MANAGED NETWORKS

(75) Inventors: Ian M. Barile, Los Angeles, CA (US); Sourabh Satish, Fremont, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1140 days.

(21) Appl. No.: 11/478,276

(22) Filed: Jun. 29, 2006

(51) Int. Cl.
*H04L 29/06* (2006.01)

(52) U.S. Cl. .............................................. 726/5; 726/25
(58) Field of Classification Search ........................ None
See application file for complete search history.

(56) References Cited

U.S. PATENT DOCUMENTS

| | | | |
|---|---|---|---|
| 6,360,334 B1 | 3/2002 | Kavanagh et al. | |
| 6,873,988 B2 | 3/2005 | Herrmann et al. | |
| 6,944,772 B2 | 9/2005 | Dozortsev | |
| 7,010,807 B1 | 3/2006 | Yanovsky | |
| 7,424,745 B2 * | 9/2008 | Cheston et al. | 726/24 |
| 7,428,753 B2 * | 9/2008 | Engle et al. | 726/12 |
| 7,533,407 B2 * | 5/2009 | Lewis et al. | 726/6 |
| 7,647,634 B2 * | 1/2010 | Mayfield et al. | 726/22 |
| 7,707,636 B2 * | 4/2010 | Catanzano | 726/24 |
| 2005/0257249 A1 * | 11/2005 | Shay | 726/3 |
| 2006/0085850 A1 * | 4/2006 | Mayfield et al. | 726/14 |

OTHER PUBLICATIONS

Windows Server System—Introduction to Network Access Protection, Microsoft Corp., May 20006, Retrieved from the Internet on May 22, 2010: <URL: http://www.opus1.com/nac/vendorwhitepapers/MS_NAPIntro.pdf>.*
Cisco Network Admission Control and Microsoft Network Access Protection, Interoperability Architecture, Cisco Systems and Microsoft Corporation, 2006.
Thurrott, Paul; Microsoft Updates Windows Server Roadmap: What Happened to R2?, Oct. 21, 2004.
Moore, Adrian, Peer Name Resolution (PNRP)—netsh, Nov. 10, 2005.
Moore, Adrian; Peer Collaboration—People Near Me; The Code Project, Apr. 18, 2006.
Petersen, Richard; Stateless Network Auto Configuration with Ipv6; Dec. 27, 2005.
Wikipedia—Trusted Platform Module, Jul. 7, 2007.
Wikipedia—Dynamic Host Configuration Protocol, Apr. 20, 2006.
Wikipedia—Ipv6, May 10, 2006.
Wikipedia—Network Access Protection, Mar. 30, 2006.
Wikipedia—Network Admission Control, Mar. 30, 2006.

* cited by examiner

*Primary Examiner*—Minh Dinh
(74) *Attorney, Agent, or Firm*—Robert C. Kowert; Meyertons, Hood, Kivlin, Kowert & Goetzel, P.C.

(57) ABSTRACT

Method and apparatus for peer-to-peer compliancy validation in secure managed networks. Embodiments may provide a peer compliancy mechanism that may augment compliancy control conventionally implemented on one or more trusted servers. Embodiments may enable nodes seeking admission to a secure managed network to communicate with a trusted node or nodes on the secure managed network for at least some compliancy functions including, but not limited to, health validation and remediation, thus reducing the load and reliance on central compliancy servers in the secure managed network.

32 Claims, 10 Drawing Sheets

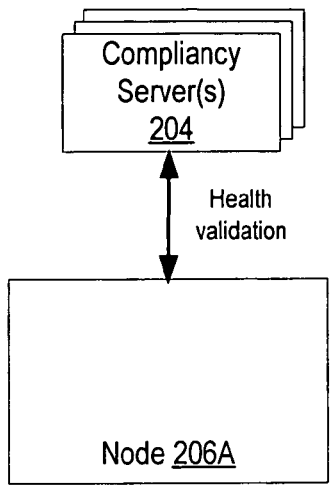
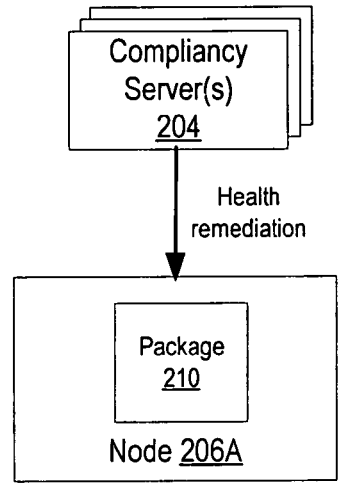
Figure 4A
Figure 4B
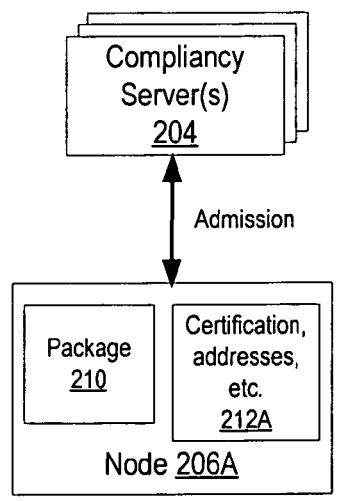
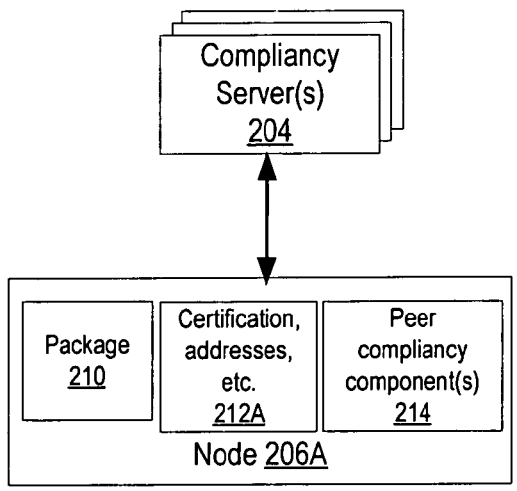
Figure 4C
Figure 4D

METHOD AND APPARATUS FOR PEER-TO-PEER COMPLIANCY VALIDATION IN SECURE MANAGED NETWORKS

BACKGROUND OF THE INVENTION

1. Field of the Invention

This invention is related to computer networking, and, more particularly, to compliancy mechanisms in secure managed networks.

2. Description of the Related Art

Conventional compliancy mechanisms in secure managed networks typically rely on a trusted server or servers to manage policy and validate clients (nodes) before allowing the clients access to the network. FIG. 1 illustrates a conventional compliancy mechanism in an exemplary secure managed network. One or more compliancy servers 104 may reside within the scope of a secure managed network 102. A client 106, such as client 106A, that desires to access or join the network 102 may first communicate with one or more of servers 104. In at least some cases, the client 106A's health may be validated before admission to the network is granted. Validating the health of a client 106 may include, but is not limited to, validating that the client has at least the minimally required software, data, and/or hardware installed to meet the security and admission requirements of the network 102. For example, network administration may specify that all clients 106 have at least specific versions of anti-spyware, anti-virus, anti-malware, and other protective/security software installed. As other examples, clients may be required to have specific firewalls, specific policies in place, and/or up-to-date definitions for various security software such as anti-virus or anti-malware software. Other aspects of health validation may include validating what kind of ports are installed and what kind of traffic is allowed through a client-level firewall.

If the client 106A passes the health validation, in some implementations the client may be granted a "health certificate" that may then be presented to a server 104, which may, based on the health certificate, admit the client 106A to the secure managed network 102. Admission to the network may include, but is not limited to, one or more of assigning secure managed network-specific address(es) to the client 106A, and issuing certificates, keys, passwords, or other security information to the client 106A. If the client 106A fails the health validation, then the client 106A may be "remedied" by obtaining a package of the needed updates or installs to bring the client's health up to specification from the server(s) 104. After installing the downloaded package, the client 106A may then seek to again have its health validated by server(s) 104. If successful, the client 106A may then seek admission to the network 102 from server(s) 104. Note that a client 106 whose health has been validated may be referred to as a "trusted" client. Once admitted to the secure managed network 102, a client 106A may communicate with one or more other clients 106 and/or one or more other devices 108 within the scope of the network 102.

Note that an admitted (or trusted) client 106, such as client 106A, may access server(s) 104 to obtain access to a global network 100, e.g. the Internet, via networking device(s) 108, such as routers. Obtaining access to the global network 100 may include, but is not limited to, one or more of assigning global network address(es) to the client 106A and issuing certificates, keys, passwords, or other security information to the client.

FIG. 2 illustrates a conventional compliancy mechanism using multiple servers with different functions in an exemplary secure managed network. FIG. 2 is essentially the same as FIG. 1, except that admission control is performed by an admission control server 110, health validation is performed by a health validation server 112, and health remediation is performed by a remediation server 114. In some implementations, admission control server may be a Dynamic Host Configuration Protocol (DHCP) server. Note that there may be one or more instances of each type of server. This example shows client 106C going through the compliancy process with the various servers in an attempt to gain admission to secure managed network 102.

IPv6

IPv6 (Internet Protocol Version 6) is the latest level of the Internet Protocol (IP) and is included as part of IP support in many products including the major computer operating systems. Formally, IPv6 is a set of specifications from the Internet Engineering Task Force (IETF). IPv6 was designed as an evolutionary set of improvements to IP Version 4. Network hosts and intermediate nodes with either IPv4 or IPv6 can handle packets formatted for either level of the Internet Protocol. An improvement in IPv6 over the IPv4 is that IP addresses are lengthened from 32 bits to 128 bits. IPv6 describes rules for three types of addressing: unicast (one host to one other host), anycast (one host to the nearest of multiple hosts), and multicast (one host to multiple hosts).

IPv6 introduces the concept of scopes (e.g., link-local, site-local and global). Site-local has the scope of an entire site, or organization. The scopes introduced by IPv6 allow addressing within an organization without the need for using a public prefix. Routers forward datagrams using site-local addresses within the site, but not outside the site to the public Internet. Site-local addresses may be differentiated from link-local addresses by having a tenth bit of "1" following the nine starting address bits common to all private IPv6 addresses. Thus, Site-local addresses begin with "1111 1110 11". In hexadecimal, site-local addresses begin with "FE" and then "C" to "F" for the third hex digit. Therefore, these addresses start with "FEC", "FED", "FEE" or "FEF". IPv6 site-local addresses allow data to be sent only to the devices within a site or organization. IPv6 link-local addresses are used only on a particular local link (physical network), typically for special purposes such as address resolution or neighbor discovery. Link-local addresses start with "FE8", "FE9", "FEA" or "FEB".

TPM

In computing, Trusted Platform Module (TPM) is both the name of a published specification detailing a microcontroller that can store secured information, as well as the general name of implementations of that specification. The TPM specification is the work of the TPM Work Group, under the auspices of the Trusted Computing Group.

SUMMARY

Embodiments of a method and apparatus for peer-to-peer compliancy validation in secure managed networks are described. Compliancy in secure managed networks may include, but is not limited to, admission control, health validation, and health remediation for nodes (clients) seeking to join the network. Embodiments may provide a peer compliancy mechanism that may augment compliancy control conventionally implemented on one or more trusted servers. Embodiments of the peer compliancy mechanism may reduce the reliance of nodes (clients) seeking admission to a secure managed network on compliancy server(s) by enabling the nodes to communicate with a trusted (client) node as a peer on the secure managed network for compliancy functions including, but not limited to, health validation and remediation, thus reducing the load on the compliancy servers in the secure managed network.

In one embodiment of a peer compliancy mechanism, a node that has been disconnected from a secured managed network (or a new node that wants to join the secure managed network) may first join to a site-local mesh. On the site-local mesh, the node may request another node on the mesh to volunteer as a peer that can validate the new node's health. One or more "trusted" nodes on the secured managed network may act as health validation peers. One or more of these health validation peers may be in the site-local mesh, and thus reachable by other nodes that join the site-local mesh without joining the secure managed network by accessing compliancy server(s). A health validation peer may respond to the request from the new node, and may perform health validation checks for the new node to see if the state of the newly connected node is as per specified compliancy policy. If the new node is found to be compliant, the health validation peer may provide a health validation result or certificate to the newly connected node. In one embodiment, the newly connected node may then communicate with an admission control server and present the health report signed by a trusted node to the admission control server to obtain one or more site-local and/or global-link addresses, and to thus be admitted to the secure managed network and/or granted access to the global network.

In embodiments of the peer compliancy mechanism, in implementations of secure managed networks using an address scoping technique (e.g., IPv6), if a node seeking to join the secure managed network wants to poll or broadcast a request for a validation peer on the network to assist the node in joining the secure managed network by validating the node's health, the transmission of packets (e.g., requests and responses) for validating the health of the node is performed at the scope of the secure managed network (e.g., at the site-local scope) or alternatively at a narrower scope (e.g., at the link-level scope) and not at a broader scope (e.g., not at the global scope). Thus, health validation requests and responses do not propagate out to the global (public) network. This, for example, may help to insure that some other node that volunteers to validate the node's health is reliable (e.g., is a trusted node on the secure managed network).

However, while at least some embodiments of the peer compliancy mechanism may leverage an address scoping technique to limit the scope of node validation and possibly other compliancy operations, note that the peer compliancy mechanism does not require an address scoping technique (e.g., IPv6). Some embodiments of the peer compliancy mechanism may be used in implementations of secure managed networks that do not use an address scoping technique, or may use other methods for limiting the scope of compliancy operations. For example, in an implementation not using an address scoping technique to limit the scope of compliancy operations such as node validation, each node on the secure managed network, and other nodes seeking to join the secure managed network, may be required to have a security certificate or some other type of secure identification. When a node volunteers to be a validation peer, the compliancy servers may require that the node responds with a signed certificate or other type of secure identification to insure that the node is on the secure managed network. When a node seeking to join the secure managed network requests to be validated by a validation peer, the node may be required to include a signed certificate in its request packet(s). In at least some implementations, a root authority, for example at the secure managed network (enterprise) domain controller level, may be responsible for signing and issuing the certificates and, in the process, insuring the integrity of the nodes (e.g., that the nodes qualify under a specified policy to at least request to join the secure managed network). Thus, a node seeking to join the secure managed network may also be required to obtain a certificate from the root authority if the node does not already possess one.

In one embodiment, a compliancy update package or portions of the package may be hosted across one or more trusted nodes or, alternatively, on every node in the secure managed network. If the new node is found to be out of compliance by the health validation peer, one or more of the nodes hosting the compliancy package may provide the necessary updates to the new node to remedy the health of the new node, and thus bring the new node into compliance. Alternatively, the compliancy update package may be hosted on a remediation server or servers, which may be accessed by the new node to bring the new node into compliance. Once the update package is deployed to the new node and any necessary update operations are performed on the new node, the new node may request to have its health validated again. In some embodiments, the compliancy update package may be hosted on a remediation server or servers, and at least portions of the package may also be hosted across one or more trusted nodes or, alternatively, on every node in the secure managed network.

BRIEF DESCRIPTION OF THE DRAWINGS

The following detailed description makes reference to the accompanying drawings, which are now briefly described.

FIGS. 4A through 4G illustrate the process of validating and admitting a node to a secure managed network that then performs at least some compliancy functions for other nodes, according to one embodiment.

Figure 1:
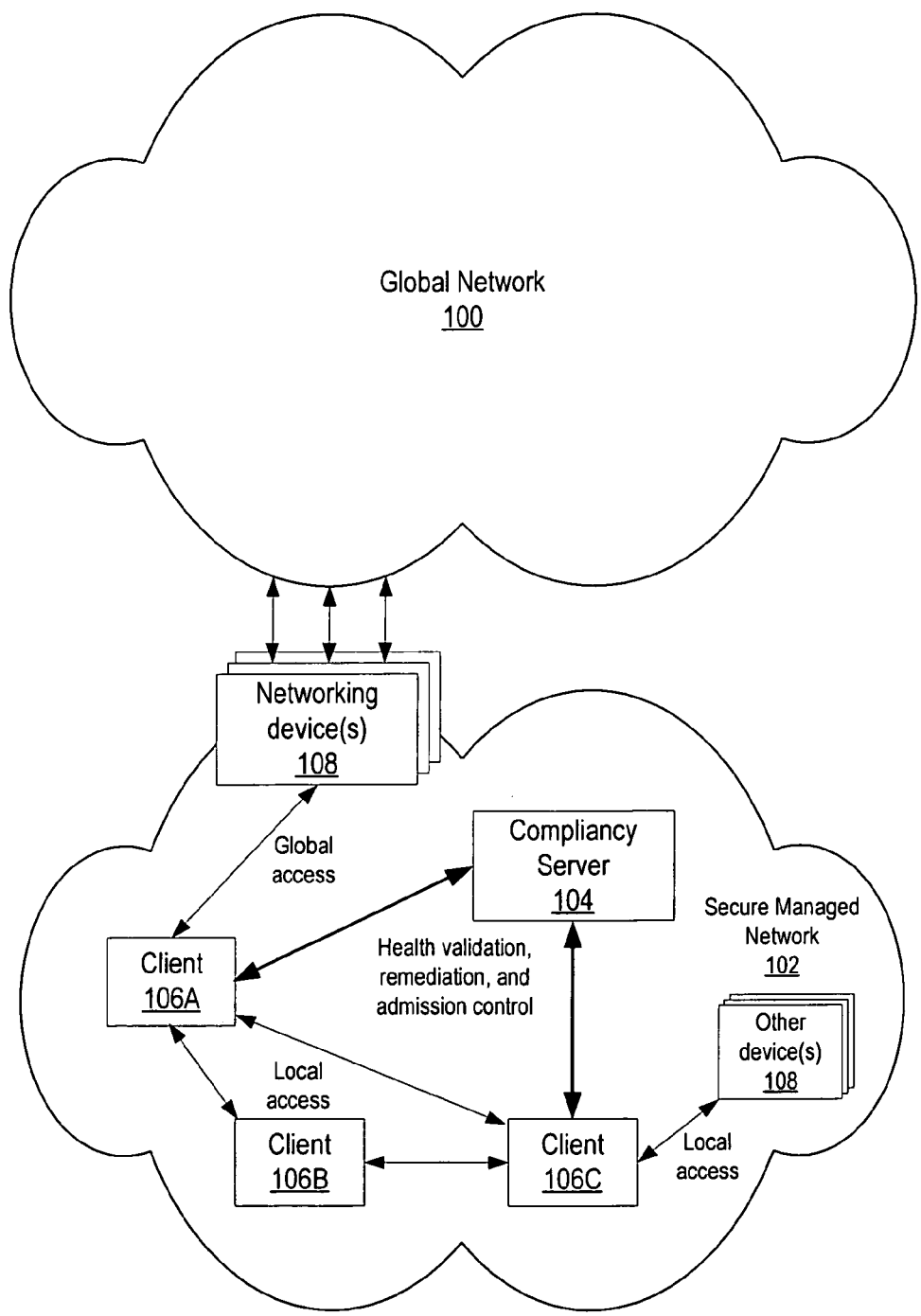
FIG. 1 illustrates a conventional compliancy mechanism in an exemplary secure managed network.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Embodiments of a method and apparatus for peer-to-peer compliancy validation in secure managed networks are described. Compliancy in secure managed networks may include, but is not limited to, admission control, health validation, and health remediation for nodes (clients) seeking to join the network. Conventional compliancy solutions, as described above, typically rely on one or more trusted servers to manage policy and validate nodes before allowing the nodes (clients) access to the network. A possible problem with compliancy servers in conventional compliancy solutions is availability; network connections may go down, or the server(s) may not support the client load sufficiently, which may delay or prevent nodes from legitimate network access. Embodiments may provide a peer compliancy mechanism that may augment compliancy control conventionally implemented on one or more trusted servers. Embodiments of the peer compliancy mechanism may reduce the reliance of nodes (clients) seeking admission to a secure managed network on compliancy server(s) by enabling the nodes (clients) to communicate with a trusted client node on the secure managed network for compliancy functions including, but not limited to, health validation and remediation, thus reducing the load on the compliancy servers in the secure managed network.

Using networking technologies such as Network Access Protection (NAP) and Network Admissions Control (NAC), one or more server nodes are responsible for validating the health of a node before admission to a secure managed network is granted. Networking technologies exist that enable nodes to create meshes or groups, for example at various scope levels of IPv6, so that node-level communications can take place without requiring a server. For example, in Microsoft's Vista OS® there are technologies built on top of IPv6 such as P2P and PNM (People Near Me). These technologies enable nodes to create meshes or groups at various IPv6 scope levels that enable communications to occur between nodes without requiring a server. Note that other networking technologies may allow node-level communications. If a P2P site-local mesh is created, a node may join the site-local mesh. Peer Name Resolution Protocol (PNRP) enables nodes (peers) with secure/insecure names to join meshes without having to go through a central. In some implementations, admission control server may be a component of a Dynamic Host Configuration Protocol (DHCP)-like infrastructure.

In one embodiment of a peer compliancy mechanism, a node that has been disconnected from a secured managed network (or a new node that wants to join the secure managed network) may first join to a site-local mesh. On the site-local mesh, the node may request another node on the mesh to volunteer as a peer that can validate the new node's health. Assuming that managed nodes on the secured managed network are in compliance with security and health policies, any compliant and thus "trusted" node that volunteers on the secured managed network may act as a "trusted" health validation peer. (Note that this implies that at least one node on the secure managed network be validated by one or more compliancy servers). One or more of these health validation peers may be in the site-local mesh, and thus reachable by other nodes that join the site-local mesh without joining the secure managed network by accessing compliancy server(s).

A health validation peer may respond to the request from the new node, and may then perform health validation checks for the new node to see if the state of the newly connected node is as per specified compliancy policy. If the new node is found to be compliant, the health validation peer may provide a health validation result or certificate to the newly connected node. In one embodiment, the newly connected node may then communicate with an admission control server (e.g., a Dynamic Host Configuration Protocol (DHCP) infrastructure) and present the health report signed by a trusted node to the admission control (e.g., DHCP) server to obtain one or more site-local and/or global-link addresses, and to thus be admitted to the secure managed network and/or granted access to the global network.

In one embodiment, the health certificate may be valid for a short period after which the health certificate expires. Expiring health certificates may help to avoid admitting a node to the secure managed network that, because of some delay, may have become non-compliant since the health certificate was issued. For example, a health certificate may be issued to a node that intends to join the secure managed network, but for some reason the node disconnects or delays, and later returns, possibly out of compliance or infected. The node may present the health certificate to the compliancy server(s) for admission to the network. Expiring the health certificate after a short period may help to insure that such a node is required to seek health validation and possibly remediation again before being admitted to the network. In addition, a malicious node might present the same health certificate that does not expire several times to the compliancy servers to obtain global scope addresses. A short expiration period for health certificate requires health validation to be performed every time a node joins the secure managed network, and thus nodes are not allowed to reuse certificates obtained in earlier connections. Further, requiring health validation to be performed every time a node joins the secure managed network helps to insure that nodes stay in compliance.

As previously mentioned, IPv6 introduces the concept of scopes (e.g., link-local, site-local and global). A packet, when sent on IPv6 through the IPv6 stack, may "hit" various network devices, but is not propagated beyond the scope of the packet. For example, if a packet is sent or broadcast with site-local scope, then the packet does not pass beyond the gateway of the "site" onto the global network (e.g., the Internet). Note that other networking technologies may implement similar address scoping techniques. In embodiments of the peer compliancy mechanism, in implementations of secure managed networks using an address scoping technique (e.g., IPv6), if a node seeking to join the secure managed network wants to poll or broadcast a request for a validation peer on the network to assist the node in joining the secure managed network by validating the node's health, the transmission of packets (e.g., requests and responses) for validating the health of the node is performed at the scope of the secure managed network (e.g., at the site-local scope) or alternatively at a narrower scope (e.g., at the link-level scope) and not at a broader scope (e.g., not at the global scope). Thus, health validation requests and responses do not propagate out to the global (public) network. This, for example, may help to insure that some other node that volunteers to validate the node's health is reliable (e.g., is a trusted node on the secure managed network). At the global scope, any node outside the secure managed network boundary might volunteer to validate the node's health and thus to enable the peer to join the secure managed network.

However, while at least some embodiments of the peer compliancy mechanism may leverage an address scoping technique to limit the scope of node validation and possibly other compliancy operations, note that the peer compliancy mechanism does not require an address scoping technique (e.g., IPv6). Some embodiments of the peer compliancy mechanism may be used in implementations of secure managed networks that do not use an address scoping technique, or may use other methods for limiting the scope of compliancy operations. For example, in an implementation not using an address scoping technique to limit the scope of compliancy operations such as node validation, each node on the secure managed network, and other nodes seeking to join the secure managed network, may be required to have a security certificate or some other type of secure identification. When a node volunteers to be a validation peer, the compliancy servers may require that the node responds with a signed certificate or other type of secure identification to insure that the node is on the secure managed network. When a node seeking to join the secure managed network requests to be validated by a validation peer, the node may be required to include a signed certificate in its request packet(s). In at least some implementations, a root authority, for example at the secure managed network (enterprise) domain controller level, may be responsible for signing and issuing the certificates to nodes and, in the process, insuring the integrity of the nodes (e.g., that the nodes qualify under a specified policy to at least request to join the secure managed network). Thus, a node seeking to join the secure managed network may also be required to obtain a certificate from the root authority if the node does not already possess one.

In one embodiment, a compliancy update package or portions of the package may be hosted across one or more trusted nodes or, alternatively, on every node in the secure managed network. If the new node is found to be out of compliance by the health validation peer, one or more of the nodes hosting the compliancy package may provide the necessary updates to the new node to remedy the health of the new node, and thus bring the new node into compliance. Alternatively, the compliancy update package may be hosted on a remediation server or servers, which may be accessed by the new node to bring the new node into compliance. Once the update package is deployed to the new node and any necessary update operations are performed on the new node, the new node may request to have its health validated again. In some embodiments, the compliancy update package may be hosted on a remediation server or servers, and at least portions of the package may also be hosted across one or more trusted nodes or, alternatively, on every node in the secure managed network. Thus, the endpoint excess storage available on the nodes may be leveraged to perform at least some remediation for at least some nodes, thus reducing the load on the remediation server(s).

In embodiments, one or more criteria may be required of a node to become a health validation peer. For example, a policy for allowing nodes to become a health validation peer may specify that mobile nodes may not act as validation peers, or alternatively that mobile nodes are low in priority to be allowed to act as a validation peers while more persistent nodes in the network are higher in priority. Limiting or prohibiting mobile nodes from acting as validation peers may help to avoid situations where a mobile node volunteers to become a validation peer and then disconnects during the validation process for a new node1 As another example, when a central authority (e.g., a compliancy server) delegates or approves a node to act as a validation peer, the approval or delegation may be made in accordance with certain known characteristics of the node. For example, past activities, functions, MAC addresses, etc., of the node may be taken into consideration before allowing a node to act as a validation peer. Thus, every node in a secure managed network may not be allowed to act as a validation peer.

In one embodiment, a Trusted Platform Module (TPM) microcontroller or analogous technology may enable nodes to be considered trustworthy nodes, and one of the criteria for becoming a health validation peer may be that the node includes such technology. In some implementations of secure managed networks, all nodes that seek to join the secure trusted network may be required to include such technology.

Note that, in some implementations, a central authority (e.g., the compliancy server(s)) may delegate or approve trusted nodes on the secure managed network to act as validation peers. However, in some implementations, a validation peer may delegate or approve trusted nodes on the secure managed network to act as validation peers in addition to or instead of the central authority.

The following is an example of how an implementation of an embodiment of the peer compliancy mechanism may work in a secure managed network. In this example, assume that the network is being initialized, for example after a power outage. Initially, a central (e.g., a compliancy) server(s) may send broadcast requests to ask for nodes on the network that volunteer to assist in validating the health of nodes seeking to join the secure managed network. One or more of the nodes on the network may be servers. Since no other non-server nodes have been validated, no non-server nodes will be able to respond to the request; a server or servers will be the only nodes that may respond. In one embodiment, the responses may include some form of random sequence or random delay; nodes may obtain the delay from the responses and issue requests for health validation in accordance with the random delay to the central server to perform health validations. This may allow certain initial nodes to join the secure managed network through the central authority (e.g., the compliancy server(s)). One or more of these nodes may volunteer for or be assigned as validation peers. As the central authority admits more and more nodes to the network, and at least some of these nodes become validation peers, when node that have not been admitted (and have not yet had their health validated) issue health validation requests, the central authority and one or more validation peers may respond to the requests. Over time, more nodes join the secure managed network, fewer nodes are seeking to join, and more nodes will be available to take on the responsibility of node validation.

Figure 3A:
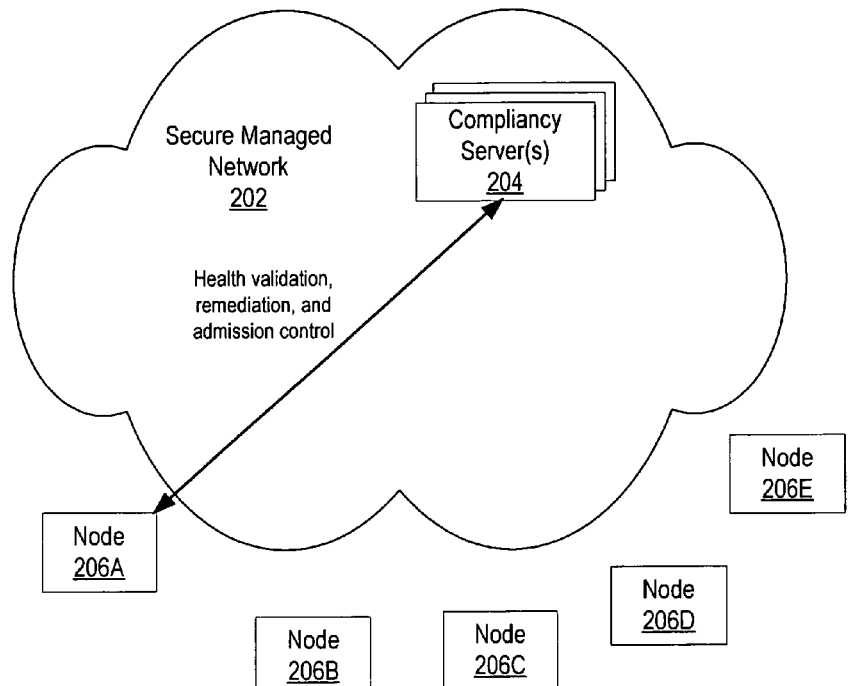
FIGS. 3A through 3F illustrate a peer-augmented compliancy mechanism in an exemplary secure managed network according to one embodiment.

FIGS. 3A through 3F illustrate a peer-augmented compliancy mechanism in an exemplary secure managed network according to one embodiment. The exemplary secure managed network 202 presented in FIG. 3A shows an "empty" initial network 202 in which only servers 204 reside and no nodes 206 have been admitted. Note that this may be the case, for example, when a secure managed network 204 is initialized, or after a failure when all nodes 206 on the network are disconnected. In these instances, one or more servers 204 on network may perform compliancy functions (e.g., health validation, remediation, and admission control) for at least one initial node 206. However, note that one or more nodes 206 (not shown) may have previously been admitted to network 204, and one or more of these nodes may volunteer or be assigned to perform one or more compliancy functions as a "trusted node" for nodes seeking access to the network 202.

In FIG. 3A, one or more compliancy servers 204 may reside within the scope of a secure managed network 202. A node 206A that desires to access or join the network 202 may first communicate with one or more of servers 204. The node 206A's health may be validated before admission to the network is granted. Validating the health of a node 206 may include, but is not limited to, validating that the node has at least the minimally required software, data, and/or hardware installed to meet the security and admission requirements of the network 202. For example, network administration may specify that all nodes 206 have at least specific versions of anti-spyware, anti-virus, anti-malware, and other protective/security software installed. As other examples, nodes may be required to have specific firewalls, specific policies in place, and/or up-to-date definitions for various security software such as anti-virus or anti-malware software. Other aspects of health validation may include validating what kind of ports are installed and what kind of traffic is allowed through a node-level firewall.

If the node 206A passes the health validation, in some embodiments the node may be granted a "health certificate" that may then be presented to a server 204, which may, based on the health certificate, admit the node 206A to the secure managed network 202. Admission to the network may include, but is not limited to, one or more of assigning address(es) specific to secure managed network 202 to the node 206A (e.g., in IPv6, site-local address(es)), and issuing certificates, keys, passwords, or other security information to the node 206A. If the node 206A fails the health validation, then the node 206A may be "remedied" by obtaining a package of the needed updates or installs to bring the node's health up to specification from the server(s) 204. After performing any necessary installation of the downloaded package, the node 206A may then seek to again have its health validated by server(s) 204. If successful, the node 206A may then seek admission to the network 202 from server(s) 204 (e.g., from a DHCP server). Note that a node 206 whose health has been validated may be referred to as a "trusted" node. Once admitted to the secure managed network 202, node 206A may communicate with one or more other nodes 206 and/or one or more other devices within the scope of the network 202.

Note that an admitted (or trusted) node 206, such as node 206A, may access server(s) 204 to obtain access to a global network, e.g. the Internet, via one or more networking devices, such as routers (not shown in FIG. 3A). Obtaining access to the global network may include, but is not limited to, one or more of assigning global network address(es) to the node 206A (e.g., IPv6 global address(es)) and issuing certificates, keys, passwords, or other security or networking information to the node 206A.

Figure 2:
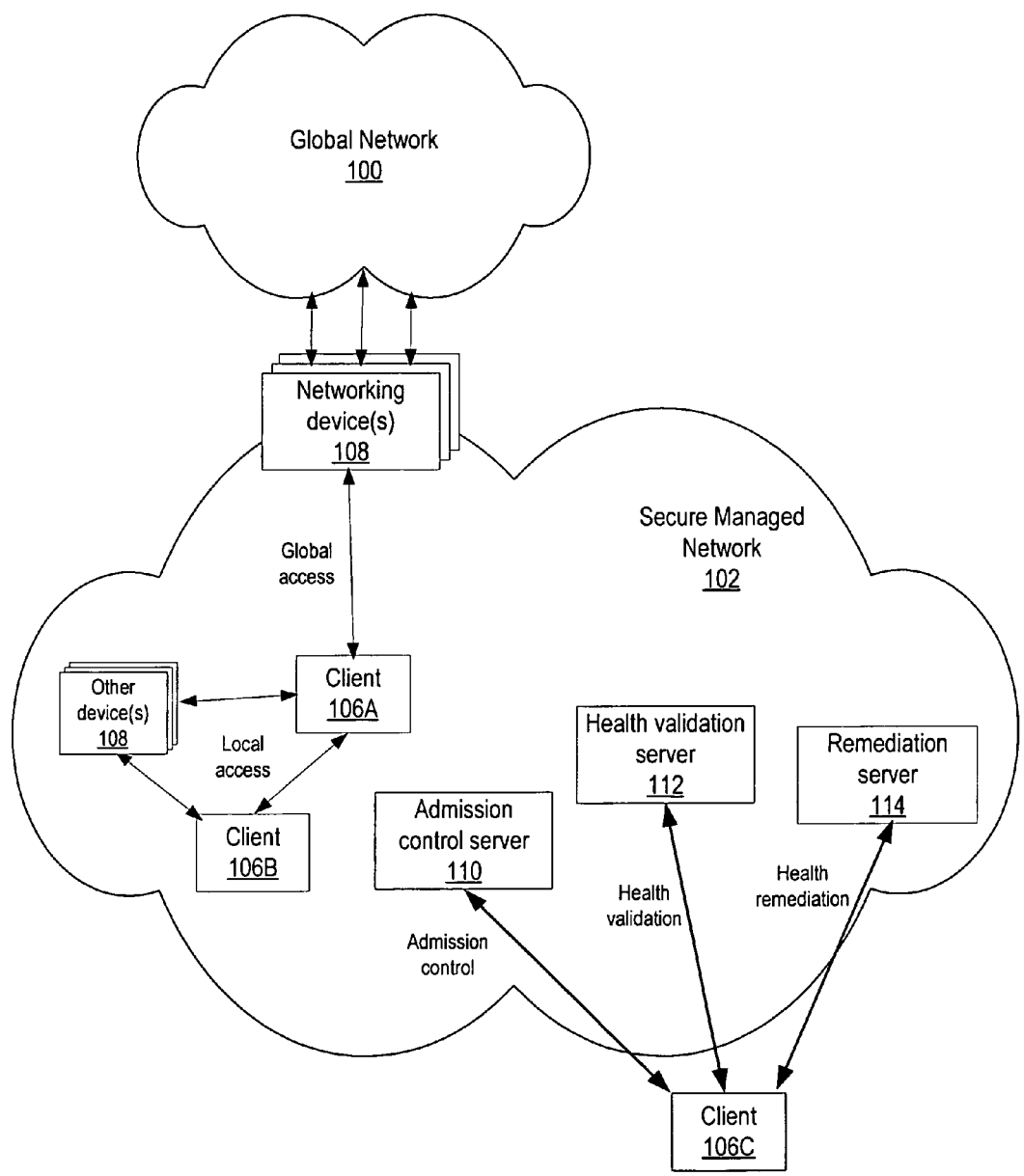
FIG. 2 illustrates a conventional compliancy mechanism using multiple servers with different functions in an exemplary secure managed network.

In some implementations of embodiments, two or more servers each configured to perform one or more specific compliancy functions may be employed to implement the server 204 portion of the compliancy mechanism. In one such implementation, as in the exemplary secure managed network illustrated in FIG. 2, admission control may be performed by an admission control server, health validation may be performed by a health validation server, and health remediation may be performed by a remediation server. Note that there may be one or more instances of each type of server. However, note that, as described below, at least part of the task of performing one or more of these and/or other compliancy functions may be assumed by one or more trusted nodes 206 on secure managed network 202 that volunteers for or is assigned to the task of performing the compliancy function(s).

Figure 3B:
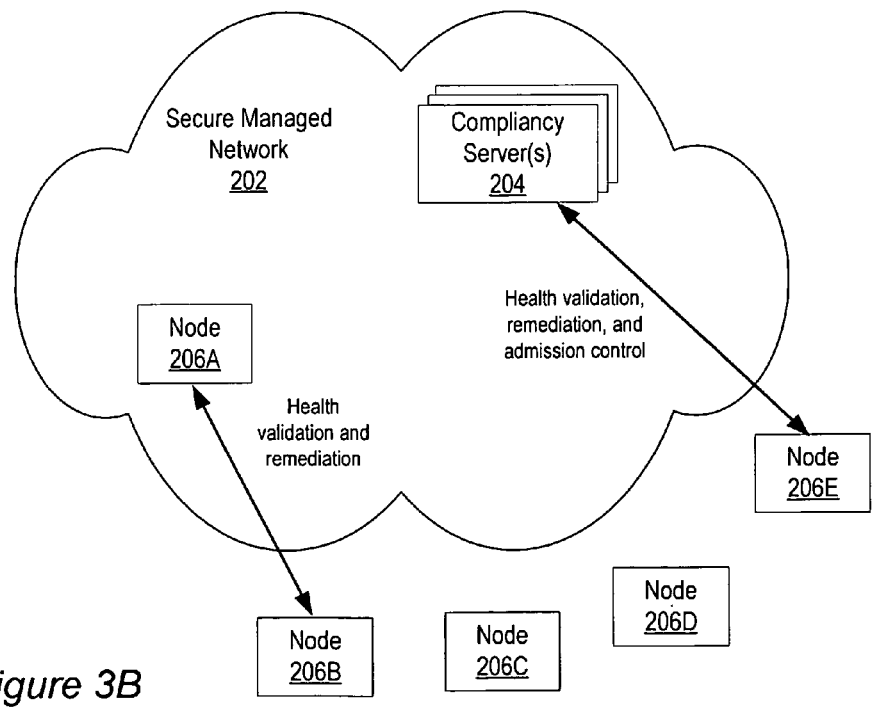

In FIG. 3B, trusted node 206A has been admitted to secure managed network 202 after passing health validation (including health remediation, if necessary) with servers 204. In one embodiment, after being admitted to secure managed network 202, trusted node 206A may volunteer to perform at least a portion of at least one compliancy function. Alternatively, trusted node 206A may be assigned the task of performing at least a portion of at least one compliancy function.

In one embodiment, a trusted node 206 may volunteer for or be assigned to the task of performing at least a portion of health validation. In one embodiment, a trusted node 206 may volunteer for or be assigned to the task of performing at least a portion of health remediation. In one embodiment, a trusted node 206 may volunteer for or be assigned to the task of performing at least a portion of health validation and at least a portion of health remediation. Note that, in some embodiments, a trusted node 206 may volunteer for or be assigned to the task of performing at least a portion of other compliancy functions. While admission control may typically be left as a task that is performed by one or more trusted compliancy servers 204, and in one embodiment a trusted node 206 will not perform admission control, it is noted that in some embodiments, a trusted node 206 may volunteer for or be assigned to the task of performing at least a portion of admission control. Further note that, while trusted node(s) 206 may volunteer for or be assigned to performing at least a portion of various compliancy functions for at least some nodes 206 seeking admittance to secure managed network 204, in one embodiment compliancy servers 204 may continue to perform the compliancy functions for at least some nodes 206 seeking admittance to secure managed network 204.

Figure 3C:
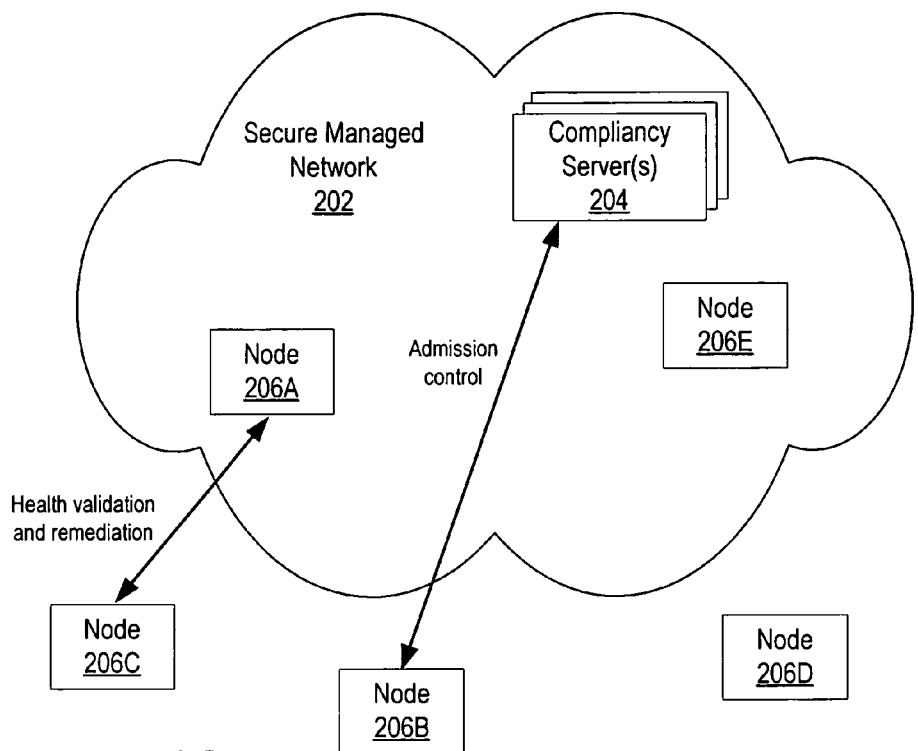

Another node 206B may seek to access or join the secure managed network 202. Node 206B may be a node that has been disconnected from the secured managed network 202 or a new node that seeks to join the secure managed network 202. Node 206B may send a request for a trusted node 206 to validate the health of the node 206B. Node 206A may respond to the request from node 206B, and may then perform health validation checks for node 206B to determine if the state of the newly connected node 206B is as per specified compliancy policy. If node 206B is found to be compliant, node 206A may provide a health certificate to node 206B. In one embodiment, the health certificate may be valid for a short period after which the certificate expires. As illustrated in FIG. 3C, Node 206B may then communicate with one or more of compliancy server(s) 204 to present the health report signed by node 206A to the server(s) 204 to gain admission to secure managed network 202. In one embodiment, node 206B may obtain one or more secure managed network-local (e.g., IPv6 site-local) and/or global network addresses from server(s) 204, and possibly other items such as certificates, keys, or passwords, and thus be admitted to the secure managed network 202.

Returning to FIG. 3B, in one embodiment, a compliancy update package or portions of the package may be hosted across one or more trusted nodes 206 or, alternatively, on every trusted node 206 in the secure managed network 202. If node 206B is found to be out of compliance by node 206A, one or more nodes 206 hosting the compliancy package may provide the necessary updates to node 206B to remedy the health of node, and to thus bring node 206B into compliance. Alternatively, the compliancy update package may be hosted on a server or servers 202, which may be accessed by the node 206B to bring the node into compliance. Once the update package is deployed to node 206B and any necessary update operations are performed, node 206B may request to have its health validated again.

In one embodiment, one or more other nodes 206 (e.g., node 206E in FIG. 3B) seeking to join the secure managed network 202 may request servers 202 for health validation, remediation, and admission even if one or more trusted nodes 206 on the network 202 have taken on the role of validation and/or remediation nodes.

In one embodiment of a peer compliancy mechanism, node 206B may first join to a site-local mesh. On the site-local mesh, node 206B may request another node (node 206A) on the mesh to volunteer as a peer that can validate the new node's health. Node 206A may respond to the request from node 206B, and may perform health validation checks and possibly remediation for node 206B as described above, and may issue a health certificate to node 206B once the node's health is validated. As illustrated in FIG. 3C, Node 206B may then communicate with one or more of compliancy server(s) 204 to present the health report signed by node 206A to the server(s) 204 to gain admission to secure managed network 202.

As noted above, FIG. 3C illustrates node 206B requesting admission to secure managed network 202 via server(s) 204. FIG. 3C further illustrates that node 206E in FIG. 3B has been admitted to network 202. After being admitted to secure managed network 202, trusted node 206E may volunteer to, or alternatively be assigned to, perform at least a portion of at least one compliancy function. FIG. 3C further illustrates another new node 206C communicating with node 206A for health validation and possibly remediation.

Figure 3D:
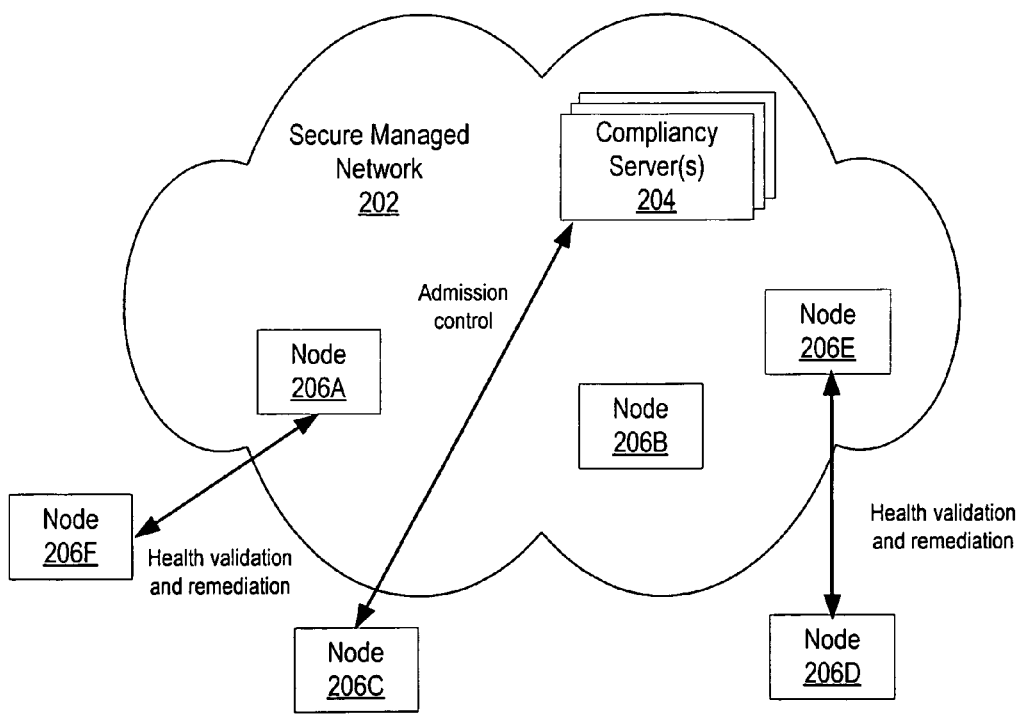

In FIG. 3D, node 206B has been admitted to the secure managed network 202. Trusted node 206C may volunteer to, or alternatively be assigned to, perform at least a portion of at least one compliancy function. Note that, in one embodiment, it may not be required that a node 206 volunteer for or be assigned to perform at least a portion of at least one compliancy function. Further note that a node 206 may not meet one or more criteria for becoming a trusted validation peer, and thus may not be allowed to assume the role of a validation peer. FIG. 3D further illustrates node 206C requesting admission to secure managed network 202 via server(s) 204. FIG. 3D further illustrates node 206F communicating with node 206A for health validation and possibly remediation, and node 206D communicating with node 206E for health validation and possibly remediation.

Figure 3E:
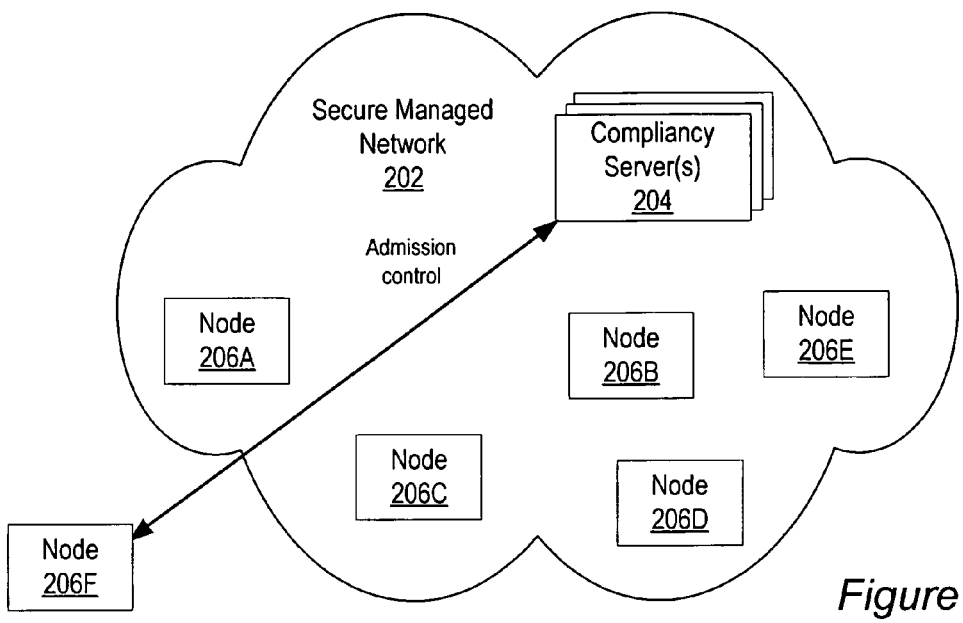

In FIG. 3E, nodes 206A, 206B, 206C, 206D, and 206E are illustrated as being admitted to secure managed network 202. Any of the trusted nodes 206 that have been admitted to the network may volunteer to, or alternatively be assigned to, perform at least a portion of at least one compliancy function. Note that, in one embodiment, it may not be required that a node 206 volunteer for or be assigned to, perform at least a portion of at least one compliancy function. Further note that a node 206 may not meet one or more criteria for becoming a trusted validation peer 206, and thus may not be allowed to assume the role of a validation peer. FIG. 3E further illustrates node 206F requesting admission to secure managed network 202 via server(s) 204.

Figure 3F:
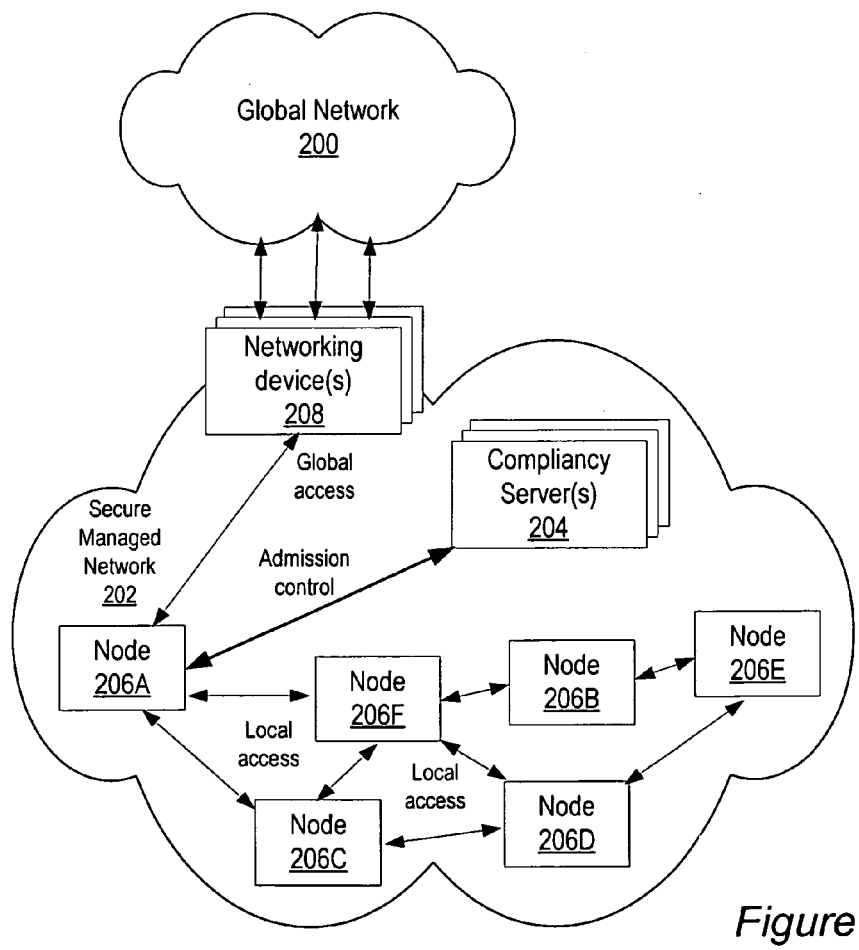

In FIG. 3F, nodes 206A, 206B, 206C, 206D, 206E, and 206F are illustrated as being admitted to secure managed network 202. In one embodiment, two or more of the nodes 206 may form a site-local mesh or similar grouping of nodes 206, and to which other nodes 206 seeking admission to secure managed network 202 may link to request health validation and possibly remediation from trusted validation peer(s) on the mesh. FIG. 3F further illustrates node 206A requesting server(s) 204 for access to global network 200 through networking device(s) 208 (e.g., routers) on secure managed network 202. In some implementations, a node 206 on a secure managed network 202 may request a global address (e.g., an IPv6 global address) or addresses from a server (e.g., a DHCP server) to gain access to global network 200 (e.g., the Internet).

Figure 4E:
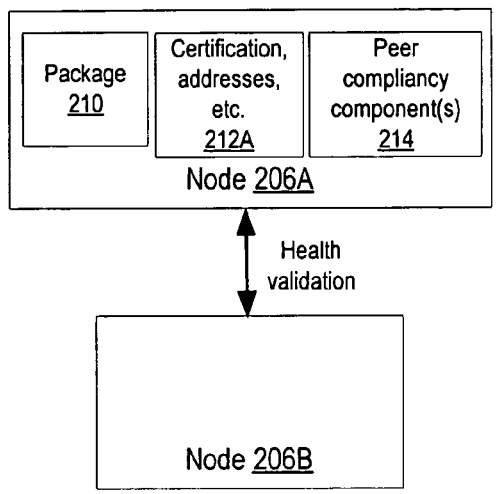

FIGS. 4A through 4G illustrate the process of validating and admitting a node to a secure managed network that then performs at least some compliancy functions for other nodes, according to one embodiment. One or more compliancy servers 204 may reside within the scope of a secure managed network. A node 206A that desires to access or join the network 202 may first communicate with one or more of servers 204. In FIG. 4A, the node 206A's health may be validated before admission to the network is granted. Validating the health of node 206A may include, but is not limited to, validating that the node has at least the minimally required software, data, and/or hardware installed to meet the security and admission requirements of the secure managed network. For example, network administration may specify that all nodes 206 have at least specific versions of anti-spyware, anti-virus, anti-malware, and other protective/security software installed. As other examples, nodes may be required to have specific firewalls, specific policies in place, and/or up-to-date definitions for various security software such as anti-virus or anti-malware software. Other aspects of health validation may include validating what kind of ports are installed and what kind of traffic is allowed through a node-level firewall.

As illustrated in FIG. 4B, if the node 206A fails the health validation, then the node 206A may be "remedied" by obtaining a package 210 of the needed updates or installs to bring the node's health up to specification from the server(s) 204. After performing any necessary installation of the downloaded package, the node 206A may then seek to again have its health validated by server(s) 204 as illustrated in FIG. 4A.

As illustrated in FIG. 4C, if node 206A passes the health validation, then the node may request server(s) 202 for admission to the secure managed network. In some implementations, a node 206 that passes health validation may be granted a "health certificate" that may then be presented to a server 204, which may, based on the health certificate, admit the node 206 to the secure managed network. Admission to the network may include, but is not limited to, one or more of assigning address(es) specific to secure managed network 202 to the node 206A (e.g., in IPv6, site-local address(es)), and issuing certificates, keys, passwords, or other security information to the node 206A, which is collectively illustrated in FIG. 4C as certification, addresses, etc. 212A.

In FIG. 4D, node 206A has been admitted to the secure managed network. Trusted node 206A may then volunteer to, or alternatively be assigned to, perform at least a portion of at least one compliancy function. In one embodiment, one or more peer compliancy component(s) 214 may be downloaded from server(s) 204 that are necessary to configure node 206A as a validation peer. Components 214 may include software and/or data necessary to perform validation of nodes 206 seeking admission to the secure managed network. Downloaded software may include, for example, one or more of various scripts, modules, programs, or other executables that are operable to perform one or more aspects of compliancy, e.g. validation. Downloaded data may include, for example, one or more compliancy policies, requirements, etc.

In FIG. 4E, a node 206B that desires to access or join the network may first communicate with validation peer 206A. The node 206B's health may be validated before admission to the network may be granted. Validating the health of node 206B may include, but is not limited to, validating that the node has at least the minimally required software, data, and/or hardware installed to meet the security and admission requirements of the secure managed network. In one embodiment, validation may be performed by and/or in accordance with peer compliancy component(s) 214 on node 206A.

Figure 4F:
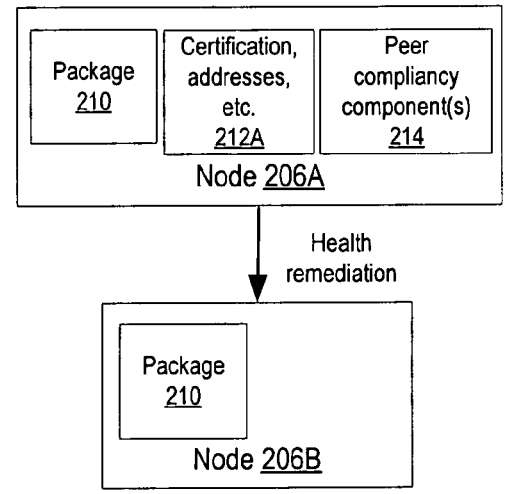

In FIG. 4F, in one embodiment, if the node 206b fails the health validation, then the node 206B may be "remedied" by obtaining a package 210 of the needed updates or installs to bring the node's health up to specification from node 206A.

Alternatively, node 206B may obtain the package 210 or portions of the package from one or more different nodes 206, or from one or more of servers 204. After performing any necessary installation of the downloaded package 210, the node 206B may then seek to again have its health validated by node 206A as illustrated in FIG. 4E. Alternatively, the node 206B may seek to have its health validated by another validation peer 206 or by one of servers 204.

Figure 4G:
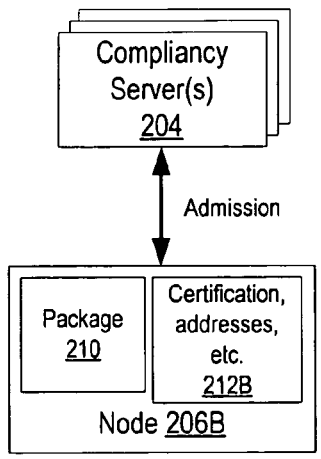

As illustrated in FIG. 4G, if node 206B passes the health validation; then the node may request server(s) 202 for admission to the secure managed network. After node 206B has been admitted to the secure managed network, the node 206B may then volunteer to, or alternatively be assigned to, perform at least a portion of at least one compliancy function.

Figure 5:
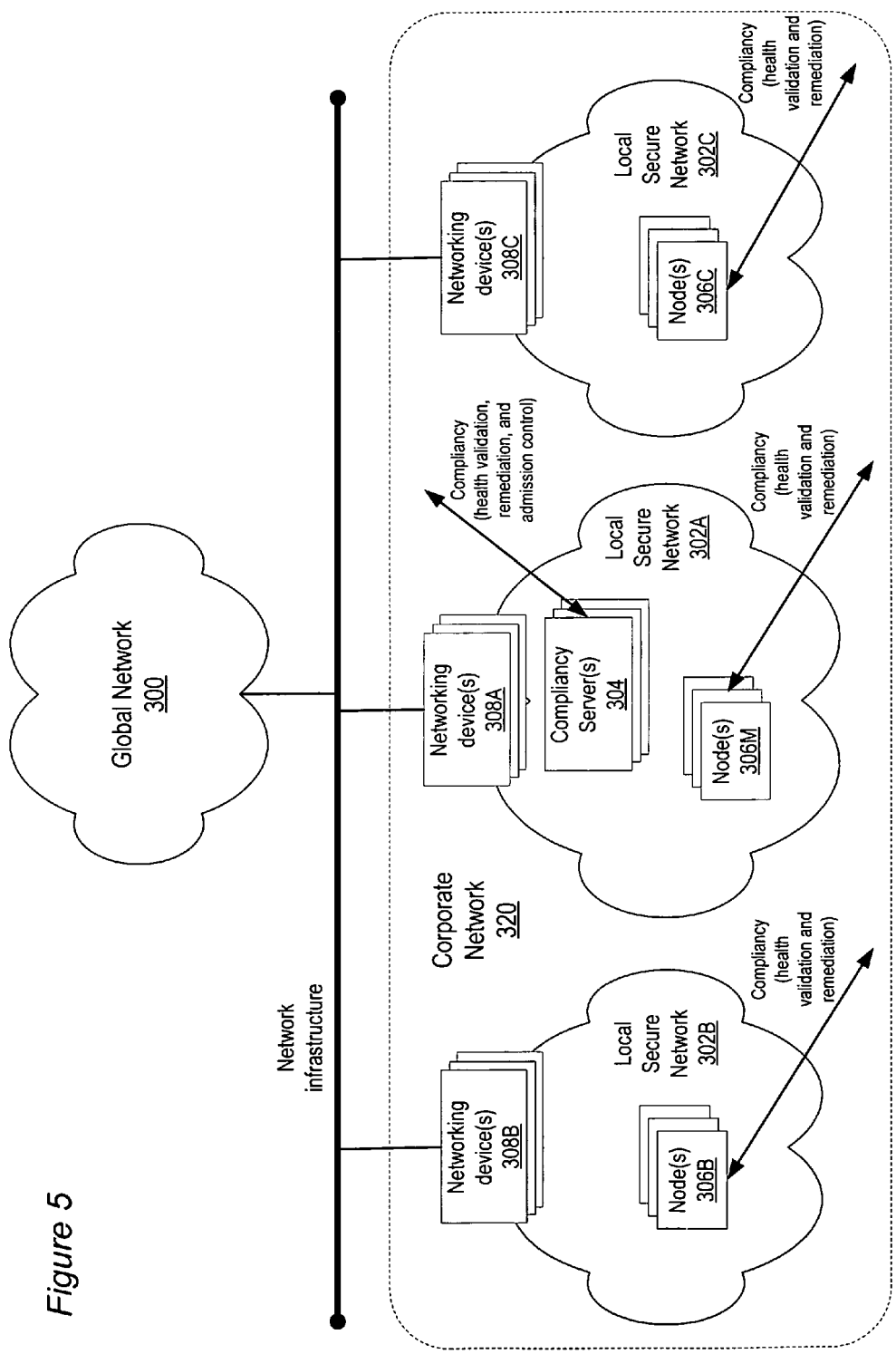
FIG. 5 illustrates an exemplary corporate network implementing a peer-augmented compliancy mechanism according to one embodiment.

FIG. 5 illustrates an exemplary corporate network implementing a peer-augmented compliancy mechanism according to one embodiment. Note that "corporate" as used herein is intended to be inclusive of any type of organization that may implement a network across multiple local sites. A corporate network 320 may include one or more (in this example, three) local secure networks 302. Each local secure network 302 may represent a particular geographic location of the organization that implements a local network with networking hardware and software, e.g. offices or sites of the organization. Note, however, that the "geographic locations" may be anything from different floors in a building, or even different rooms, areas, or offices in a building, to different buildings on a site, to different sites in a city or other municipality, to sites in different cities or even different countries. Each local secure network 302 may connect to a network infrastructure representing a broader "global" network via one or more networking devices 308, such as routers.

As previously noted, IPv6 introduces the concept of scopes (link-local, site-local and global). Site-local has the scope of an entire site, or organization. The scopes introduced by IPv6 allow addressing within an organization without the need for using a public prefix. Routers forward datagrams using site-local addresses within the site (e.g., within corporate network 320), but not outside the site to the public Internet (global network 300). Thus, in at least some implementations of a corporate network 320, site-local addresses may be used for addressing entities within the corporate network 320. Link-local addresses may be used within a local secure network 302.

In some implementations, a corporate network 320 may include one or more compliancy server(s) 304 at one local secure network 302A, e.g. at a networking center or corporate headquarters. Other local secure networks 302 on the corporate network may not include compliancy server(s) 304. Thus, conventionally, all compliancy requests would have to go to the compliancy server(s) on the local secure network 302A.

In a corporate network 320 implementing a peer-augmented compliancy mechanism, one or more trusted nodes 306 on one or more of the local secure networks 302 may volunteer or be assigned to become validation peers. The validation peer(s) 306 on a local secure network 302 may then perform one or more compliancy functions for nodes 306 seeking to join the local secure network 302. In one embodiment, two or more nodes 306 on a local secure network 302 may form a mesh at the scope of the local secure network 302, and nodes 306 seeking to join the local secure network 302 may first join to the local mesh to communicate with at least one of the validation peers 306, for example to validate and, if necessary, remedy the health of the joining node 306. A validated node 306 may then communicate with the server(s) 304 to obtain admission to the corporate network 320, for example by providing a health certificate to the server(s) 304 obtained from the validation peer 306. Alternatively, two or more nodes 306 may form a mesh at the scope of the corporate network 320. Thus, in a corporate network 320 implementing a peer-augmented compliancy mechanism, nodes 306 at the scope of local secure networks 302 may alleviate at least some of the compliancy burden on server(s) 304 by distributing at least some compliancy functions across nodes 306 on the corporate network 320.

Figure 6:
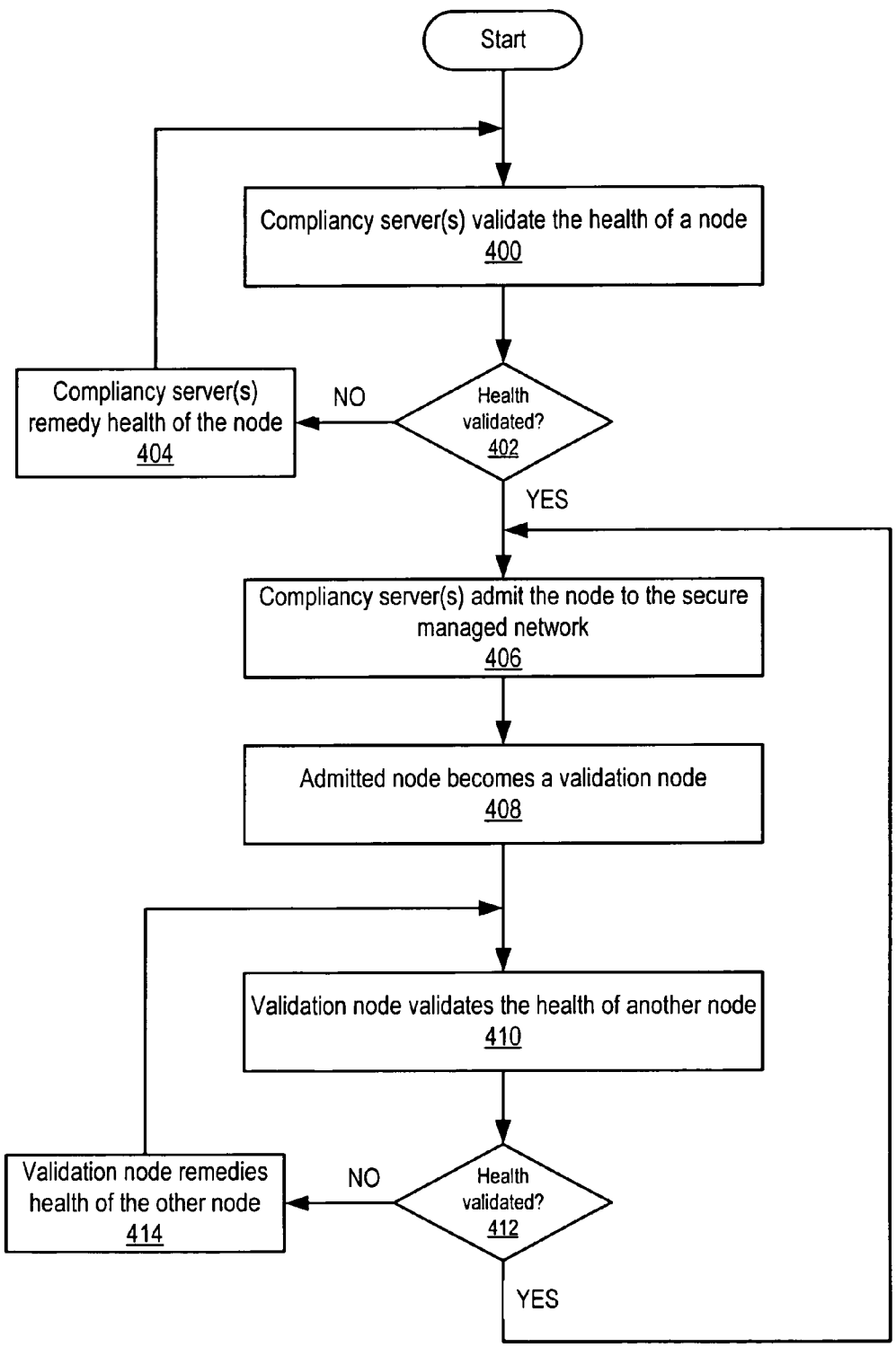
FIG. 6 is a flowchart illustrating a method for implementing a peer-augmented compliancy mechanism as described herein, according to one embodiment.

FIG. 6 is a flowchart illustrating a method for implementing a peer-augmented compliancy mechanism as described herein, according to one embodiment. Initially, one or more compliancy server(s) may validate the health of a node seeking admittance to a secure managed network, as indicated at 400. At 402, if the node fails the health validation, one or more of the compliancy servers may remedy the health of the node. For example, the compliancy server(s) may download a compliancy package to the node. The node may then seek to have its health validated again. At 402, if the node's health is validated, the compliancy server(s) may admit the node to Secure Managed Network, as indicated at 406. As indicated at 408, the admitted, and trusted, node may become a validation peer, either by volunteering to be a validation peer or by being assigned as a validation peer.

As indicated at 410, the validation peer may validate the health of another node seeking admittance to the secure managed network. At 412, if the node fails the health validation, the validation peer (or, alternatively, some other node or one of the compliancy servers) may remedy the health of the node. For example, the validation peer may download a compliancy package to the node. The node may then seek to have its health validated again by the validation peer. Alternatively, the node may seek to have its health validated again by some other node or by the compliancy server(s). At 412, if the node's health is validated, the node may seek admittance to the secure managed network via the compliancy server(s), which may admit the node to the secure managed network, as indicated at 406. In one embodiment, the validation peer may provide a health certificate to the node, which may then provide the validation certificate to the compliancy server(s) as proof of its health to gain admission. In one embodiment, the health certificate may be valid for a short period after which the certificate expires. As indicated at 408, the admitted, and trusted, node may itself become a validation peer, either by volunteering to be a validation peer or by being assigned as a validation peer.

Exemplary System

Figure 7:
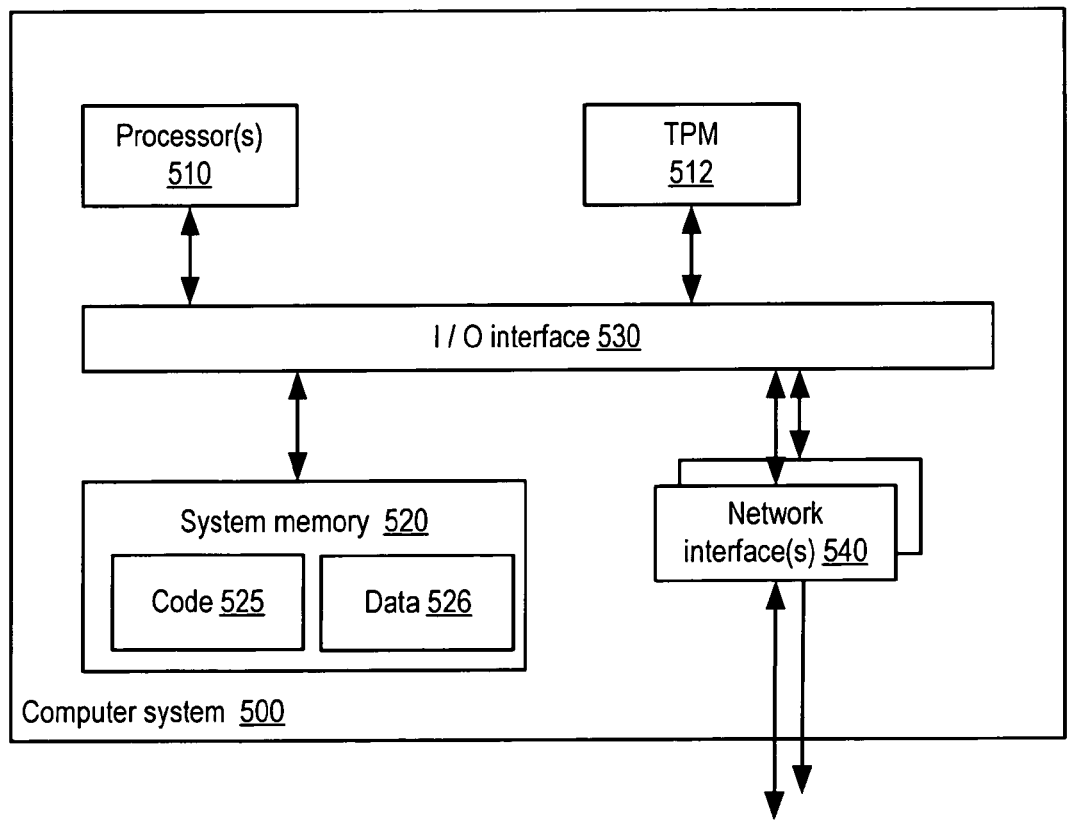
FIG. 7 is a block diagram illustrating an exemplary embodiment of a computer system.

In one embodiment, a system that implements an embodiment of the peer compliancy mechanism or one or more components of the peer compliancy mechanism as described herein may include a general-purpose computer system that includes or is configured to access one or more computer-accessible media, such as computer system 500 illustrated in FIG. 7. In the illustrated embodiment, computer system 500 includes one or more processors 510 coupled to a system memory 520 via an input/output (I/O) interface 530. Computer system 500 further includes one or more network interfaces 540 coupled to I/O interface 530. In some embodiments, computer system 500 may be illustrative of a system that implements an embodiment of the peer compliancy mechanism, while in other embodiments a system that implements an embodiment of the peer compliancy mechanism may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by processor(s) 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a peer compliancy mechanism, are shown stored within system memory 520 as code 525 and data 526.

In one embodiment, I/O interface 530 may be configured to coordinate I/O traffic between processor 510, system memory 520, and any peripheral devices in the device, including network interface 540, or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

One or more peripheral devices may couple to system 500 via I/O interface 530, such as a keyboard, one or more cursor control devices (such as a mouse), and one or more monitors (which may also be referred to as displays or display devices).

System 500 may include a Trusted Platform Module (TPM) 512 coupled to I/O interface 530. TPM 512 may be a microcontroller that is configured to store secured information for system 500.

Network interface(s) 540 may be configured to allow data to be exchanged between computer system 500 and other devices on a network or networks, such as other computer systems, for example. In particular, network interface(s) 540 may be configured to allow communication between computer system 500 and one or more other systems that may use the peer compliancy mechanism to validate and/or remedy health in secure managed networks. In various embodiments, network interface 540 may support communication via any suitable wired or wireless data networks, such as types of Ethernet networks and Fibre Channel networks, for example. Additionally, network interface(s) 540 may support communication via telecommunications/telephony networks such as analog voice networks or digital fiber communications networks, via storage area networks such as Fibre Channel SANs, or via any other type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface(s) 540.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A compliancy method for a secure managed network, comprising:
   admitting one or more client nodes to the secure managed network, wherein said admitting is performed by one or more compliancy servers;
   designating at least one of the one or more client nodes as validation peers configured to perform health validations for other client nodes seeking admission to the secure managed network;
   receiving on a validation peer a request for health validation from another client node not on the secure managed network; and
   performing, by the validation peer, a health validation check of the other client node not on the secure managed network.

2. The method as recited in claim 1, further comprising admitting the other client node to the secure managed network if the other client node passes the health validation check.

3. The method as recited in claim 2, wherein said admitting the other client node to the secure managed network comprises:
   presenting a health certificate from the validation peer to the other client node;

presenting the health certificate from the other client node to at least one of the one or more compliancy servers; and admitting the other client node to the secure managed network via the at least one of the one or more compliancy servers in response to the health certificate.

4. The method as recited in claim 3, wherein the health certificate includes an expiration period after which the health certificate is not valid.

5. The method as recited in claim 1, further comprising remedying the health of the other client node if the other node does not pass the health validation check.

6. The method as recited in claim 5, further comprising the other client node submitting a new request for health validation on the secure managed network after said remedying the health of the other node.

7. The method as recited in claim 5, wherein said remedying the health of the other client node comprises providing one or more health update components to the other client node.

8. The method as recited in claim 7, wherein at least a portion of the one or more health update components is provided by the validation peer.

9. The method as recited in claim 7, wherein at least a portion of the one or more health update components is provided by at least one of the one or more compliancy servers.

10. The method as recited in claim 1, further comprising:
forming a site-local mesh among the one or more client nodes admitted to the site-local network, wherein the validation peer is on the site-local mesh; and
joining the other client node not on the secure managed network to the site-local mesh;
wherein communications between the other client node and the validation peer are performed on the site-local mesh.

11. The method as recited in claim 1, wherein the request for health validation from the other client node not on the secure managed network is limited to the scope of the secure managed network or to a portion of the secure managed network and is thus not broadcast onto a global network.

12. A secure managed network, comprising:
one or more compliancy servers;
one or more client nodes admitted to the secure managed network, wherein at least one of the one or more client nodes is designated as a validation peer, wherein the validation peer is configured to:
receive a request for health validation from another client node not on the secure managed network; and
perform a health validation check of the other client node not on the secure managed network.

13. The secure managed network as recited in claim 12, wherein the one or more compliancy servers are configured to admit the other client node to the secure managed network if the other client node passes the health validation check.

14. The secure managed network as recited in claim 12, wherein, if the other client node passes the health validation check, the validation peer is further configured to present a health certificate to the other client node;
wherein the one or more compliancy servers are configured to:
receive the health certificate from the other client node; and
admit the other client node to the secure managed network in response to the health certificate.

15. The secure managed network as recited in claim 14, wherein the health certificate includes an expiration period after which the health certificate is not valid.

16. The secure managed network as recited in claim 12, wherein, if the other client node does not pass the health validation check, the validation peer is further configured to remedy the health of the other client node.

17. The secure managed network as recited in claim 16, wherein the other client node is configured to submit a new request for health validation on the secure managed network after said remedying the health of the other client node.

18. The secure managed network as recited in claim 16, wherein, to remedy the health of the other client node, one or more health update components are provided to the other client node.

19. The secure managed network as recited in claim 18, wherein at least a portion of the one or more health update components is provided by the validation peer.

20. The secure managed network as recited in claim 18, wherein at least a portion of the one or more health update components is provided by at least one of the one or more compliancy servers.

21. The secure managed network as recited in claim 12,
wherein the one or more client nodes admitted to the site-local network are configured to form a site-local mesh, wherein the validation peer is on the site-local mesh; and
wherein the other client node not on the secure managed network is configured to join to the site-local mesh;
wherein communications between the other client node and the validation peer are performed on the site-local mesh.

22. The secure managed network as recited in claim 12, wherein the request for health validation from the other client node not on the secure managed network is limited to the scope of the secure managed network or to a portion of the secure managed network and is thus not broadcast onto a global network.

23. A client node on a secure managed network including one or more compliancy servers, comprising:
a processor; and
a memory comprising program instructions, wherein the program instructions are executable by the processor to implement a peer compliancy mechanism configured to:
receive a request for health validation from another client node not on the secure managed network; and
perform a health validation check of the other client node not on the secure managed network.

24. The client node as recited in claim 23, wherein, if the other client node passes the health validation check, the peer compliancy mechanism is further configured to present a health certificate to the other node.

25. The client node as recited in claim 24, wherein the health certificate includes an expiration period after which the health certificate is not valid.

26. The client node as recited in claim 23, wherein, if the other client node does not pass the health validation check, the peer compliancy mechanism is further configured to remedy the health of the other client node.

27. The client node as recited in claim 26, wherein, to remedy the health of the other client node, the peer compliancy mechanism is further configured to provide one or more health update components to the other client node.

28. A computer-accessible storage medium comprising program instructions, wherein the program instructions are computer-executable to implement a peer compliancy mechanism on a client node on a secure managed network including one or more compliancy servers, wherein the peer compliancy mechanism is configured to:
receive a request for health validation from another client node not on the secure managed network; and
perform a health validation check of the other client node not on the secure managed network.

29. The computer-accessible storage medium as recited in claim 28, wherein, if the other client node passes the health validation check, the peer compliancy mechanism is further configured to present a health certificate to the other client node.

30. The computer-accessible storage medium as recited in claim 29, wherein the health certificate includes an expiration period after which the health certificate is not valid.

31. The computer-accessible storage medium as recited in claim 28, wherein, if the other client node does not pass the health validation check, the peer compliancy mechanism is further configured to remedy the health of the other client node.

32. The computer-accessible storage medium as recited in claim 31, wherein, to remedy the health of the other client node, the peer compliancy mechanism is further configured to provide one or more health update components to the other client node.

* * * * *